Feb. 17, 1959  S. PERLMAN  2,874,339
CONTROL OF POWER DELIVERY TO ELECTRICAL APPARATUS
Filed Feb. 24, 1956
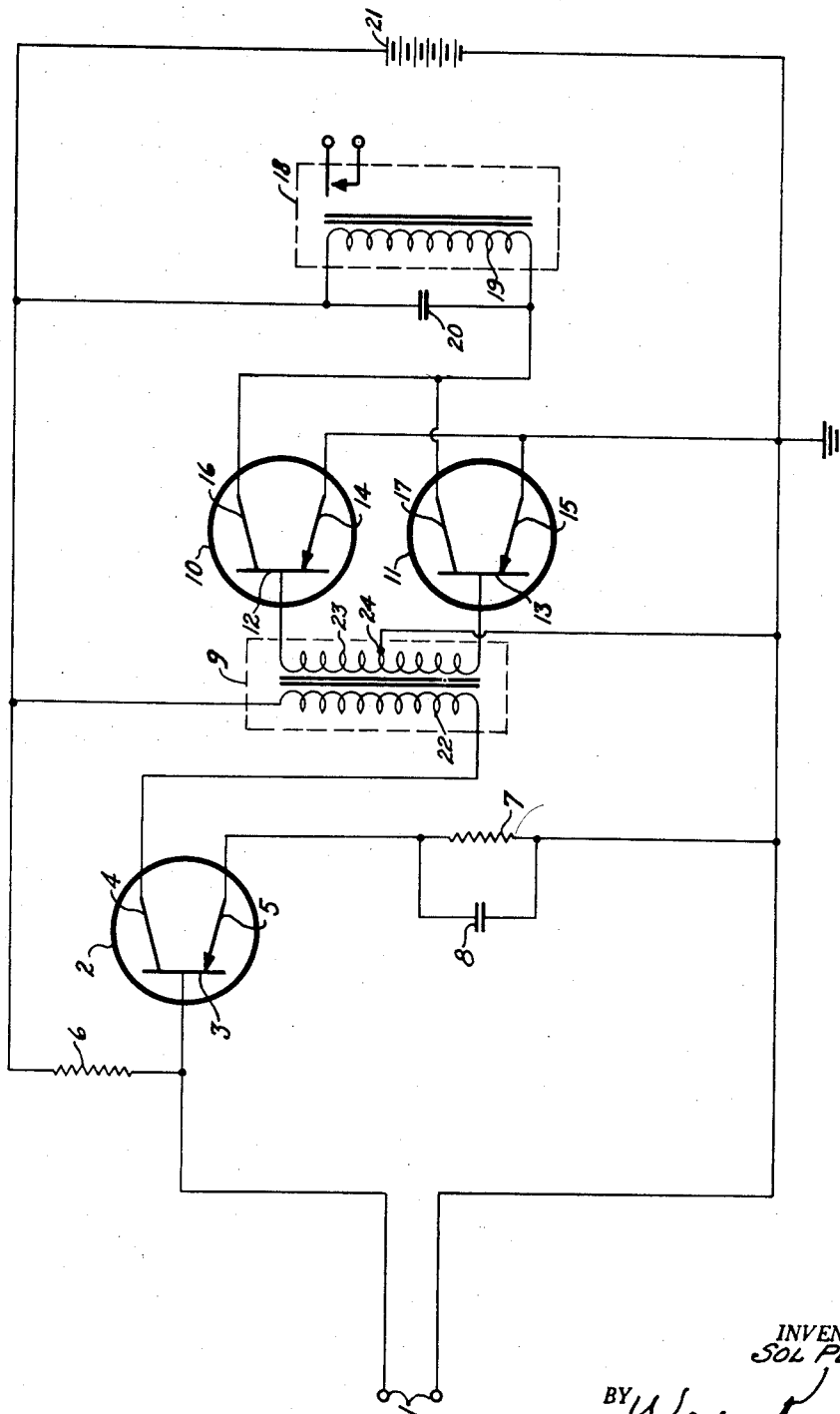
INVENTOR.
SOL PERLMAN
BY
ATTORNEYS

United States Patent Office 2,874,339
Patented Feb. 17, 1959

2,874,339

CONTROL OF POWER DELIVERY TO ELECTRICAL APPARATUS

Sol Perlman, Brooklyn, N. Y., assignor to the United States of America as represented by the Secretary of the Air Force Application February 24, 1956, Serial No. 567,695

1 Claim. (Cl. 317—148.5)

(Granted under Title 35, U. S. Code (1952), sec. 266)

The invention described herein may be manufactured and used by or for the United States Government for governmental purposes without payment to me of any royalty thereon.

This invention relates to a circuit for actuating a direct current operated electro-mechanical relay by alternating current signals, and more particularly to a circuit utilizing a transistor amplifier and current rectifier which is energized by low-level powered alternating current signals.

This invention in one aspect involves a novel arrangement of an electrical power supply apparatus for the purpose of energization of an electrical power consuming device, or load, such as an electro-mechanical relay assembly, dynamo electric unit or other apparatus for utilization of electrical power.

This invention also includes novel methods and novel electrical circuitry for controlling the delivery of electrical power to an electrical load such as an electro-mechanical relay assembly or other apparatus for utilization of electrical power, such methods and circuitry having the characteristics of conserving power particularly during standby periods.

A further object of the invention is to provide a circuit which utilizes more efficiently power from a battery or other direct current local power source for the purpose of energization of an electrical power consuming load, such as an electro-magnetic relay assembly.

The advantages of this invention over the prior art include, among others, the extremely low standby power consumption when the equipment is inactive, the high efficiency of utilizing the power from a battery or other direct current power source when the electro-mechanical relay is actuated, the lack of critical adjustment, the circuit simplicity and reduction in size, weight, power consumption and the number of direct current power sources required. In airborne equipment it eliminates the need for a special power supply by utilizing the power from the aeroplane's 28 to 32 volt direct current power source. It utilizes the standard size commercial electro-mechanical relay with its heavier current contact rating. It permits ground equipment located remotely from commercial power sources to be operated economically from a local battery for long periods of many days or weeks, while unattended.

The features of this invention which are believed to be novel are set forth with particularity in the appended claims. The invention itself, however, together with further objects and advantages thereof may best be understood by reference to the following description when taken in conjunction with the accompanying drawing illustrating schematically one embodiment of the invention.

The drawing shows signal input terminals 1 to which incoming alternating current signals are applied. The low-level powered alternating signal applied to input terminals 1 could be that typically available from a voice transmitted radio, telephone wire current signal from an electro-mechanical transducer or from a low powered alternating signal source. The said input alternating current signal is applied to base 3 of transistor 2. Resistor 6 provides current bias to the base 3. Resistor 7 provides current bias for emitter 5. Capacitance 8 provides adequate bypassing of alternating current signals to emitter 6 of transistor 2. The amplified alternating current signals appear on primary 22 of transformer 9. Transformer 9 is a step-down transformer to transfer the maximum amount of power to the push-pull input connections of the bases 12 and 13 of transistors 10 and 11, respectively. Since center-tap 24 of secondary 23 of transformer 9 is connected to the same point of circuit potential as emitter 14 and 15 of transistors 10 and 11, respectively, the said transistors draw a minimum no signal current in the collector circuits characteristic of class "B" amplifier operation. With the characteristic no signal current flowing through coil winding 19 of relay 18, relay 18 is not actuated. The battery 21 supplies current for the operation of the circuit during both no signal and signal input operation. The amplified alternating current signal power appearing across the center-tapped winding of secondary 23 of transformer 9 is referenced at zero direct current voltage with respect to the emitters 14 and 15 of transistors 10 and 11, respectively. When the signal voltage to base 12 of transistor 10 is sufficiently positive to the referenced zero point of transformer secondary center-tap 24 on transistor 10 during one-half of the alternating current cycle, the collector current increases above the no signal current to saturation. When the signal voltage to base 12 is negative to the referenced zero point of transformer secondary center-tap 24 of transistor 10 during the other half of the alternating current cycle, the collector current does not change with respect to the no signal current. Since the signal voltage to base 13 of transistor 11 is connected to the opposite end of secondary winding 23 of transformer 9, its collector current flow is 180 electrical degrees out of phase. By connecting the collectors 16 and 17 of transistors 10 and 11, together to one terminal of coil winding 19 of the electro-mechanical relay 18, the resultant rectified alternating current has a large direct current component to actuate electro-mechanical relay 18. Capacitance 20 helps to filter out the alternating current rectified ripple voltage.

The two transistors 10 and 11 supply direct current for the coil winding 19 of relay 18. The rectifier current is sufficient to actuate a rugged relay.

The two transistors 10 and 11 are supplied with a sufficiently large alternating current signal in push-pull at its input base terminals 12 and 13, respectively, and thereby supplies an effective direct current signal due to collector current saturation.

The first stage of amplification represented by transistor 2 and its associated circuitry including transformer 9 amplify the low-level powered signal that overdrives the base terminals 12 and 13 of transistors 10 and 11, respectively, so that their collector current saturate.

While particular embodiments of the invention have been shown and described, modifications may be made. It is intended in the appended claim to cover all such modifications as fall within the true spirit and scope of the invention.

What is claimed is:

A circuit for controlling the energization of an electrical power consuming device comprising a terminal adapted to receive an actuating alternating current signal, a first transistor operating as an amplifier for said signal, said first transistor having emitter, collector and base electrodes, said base electrode being simultaneously connected to said terminal and to the positive side of a power source by way of a first resistor, said power source having its negative side connected to ground, said emitter electrode being connected to ground by way of a second resistor in shunt with a first capacitor, a tranformer having a single ended primary winding and a balanced secondary winding, one side of said primary winding being connected to said collector of said first transistor, the other side of said primary winding being connected to said positive side of said power source, a pair of transistors, each of said pair of transistors having emitter, collector and base electrodes, said base electrodes of said pair of transistors being supplied a push-pull amplified alternating current signal by way of said balanced secondary winding, said emitters of said pair of transistors being connected to ground, said collectors of said pair of transistors connected to one side of a direct current relay winding, the other side of said relay winding being connected to said positive side of said power source, a second capacitor in shunt with said relay winding, and a relay switch actuated by energization of said relay winding when said pair of transistors undergo collector current saturation in reponse to said push-pull input signal.

References Cited in the file of this patent
UNITED STATES PATENTS

| | | |
|---|---|---|
| 2,694,762 | Ruetschi | Nov. 16, 1954 |
| 2,698,392 | Herman | Dec. 28, 1954 |
| 2,718,613 | Harris | Sept. 20, 1955 |
| 2,750,452 | Goodrich | June 12, 1956 |
| 2,781,479 | Rice | Feb. 12, 1958 |